United States Patent Office.

CARL LUDWIG MÜLLER, OF LUDWIGSHAFEN, GERMANY, ASSIGNOR TO THE BADISCHE ANILIN AND SODA FABRIK, OF SAME PLACE.

ORANGE DYE.

SPECIFICATION forming part of Letters Patent No. 524,262, dated August 7, 1894.

Application filed February 1, 1894. Serial No. 498,696. (Specimens.) Patented in Germany July 9, 1893, No. 73,369, and in France October 28, 1893, No. 231,694.

*To all whom it may concern:*

Be it known that I, CARL LUDWIG MÜLLER, doctor of philosophy, a subject of the King of Bavaria, residing at Ludwigshafen-on-the-Rhine, in the Kingdom of Bavaria and Empire of Germany, have invented new and useful Improvements in the Manufacture of an Orange-Yellow Coloring-Matter, (for which patents have been obtained in Germany, No. 73,369, dated July 9, 1893, and in France, brevet No. 231,694, dated October 28, 1893,) of which the following is a specification.

My invention relates to the manufacture of a new substantive dye for cotton which is chemically an azo-dye derived from primulin and a disulfoacid of meta-phenylene-diamin.

The process for the manufacture of my new dye consists in first preparing the meta-phenylene-diamin-disulfoacid and then combining it with diazo-primulin. The disulfoacid is obtained by treating meta-phenylene-diamin or salts thereof with fuming sulfuric acid and sufficient acid must be taken that at least two molecular proportions of free or available sulfuric anhydride ($SO_3$) are present for one molecular proportion of meta-phenylene-diamin. If this condition be satisfied the strength of acid and temperature of treatment may be varied within certain limits, though the ease with which the reaction can be effected increases as the excess of fuming acid present or the strength thereof is increased. Thus when using an acid containing about ten per cent. free anhydride a temperature of about 120° centigrade was found necessary to effect the reaction while with an acid containing about seventy per cent. $SO_3$ a temperature of about 70° was sufficient.

The following test will serve as a guide when preparing the disulfoacid:—Take a test-portion of the sulfonation melt and combine it in alkaline solution with diazo-primulin. The dye obtained will fix itself on cotton giving orange-yellow shades if the production of the desired disulfoacid is complete, the presence of unchanged meta-phenylene-diamin or of the monosulfoacid thereof causes the color to be of a browner shade.

The following examples will serve to further illustrate the invention and the best manner of carrying it into practical effect. The parts are by weight.

1. *Production of the meta-phenylene-diamin-disulfoacid.*—Mix one (1) part of meta-phenylene-diamin-hydrochlorate with about five (5) parts of fuming sulfuric acid containing about forty (40) per cent. free anhydride, keep cool while mixing and subsequently heat the mixture at first for a few hours at about one hundred (100) degrees centigrade and subsequently raise the heat to about one hundred and twenty (120) degrees and maintain it for about six to ten (6 to 10) hours or until the test above described indicates the end of the reaction. Pour the mixture into ice-water, neutralize with milk of lime, filter from the sulfate of lime, and convert into sodium salt in the usual way. The solution of sodium salt so obtained may be used directly in the manufacture of dyes. The free acid may also be isolated. For this purpose concentrate the solution of the calcium or sodium salt by evaporation, and add an excess of strong hydrochloric acid to the concentrated solution, filter and dry the precipitate of di-sulfoacid which separates out. When pure, this is a white crystalline powder, readily soluble in hot water, less soluble in cold water.

2. *Production of the new substantive dye for cotton from primulin and meta-phenylene-diamin-disulfoacid.*—Diazotize about one hundred and twelve (112) parts of primulin in aqueous solution by adding about sixteen (16) parts of sodium nitrite and about one hundred and forty (140) parts of hydrochloric acid (thirty per cent. HCl) in the well-known way. Run the mixture into an ice cold solution of about fifty five (55) parts of meta-phenylene-diamin-disulfoacid and about one hundred and twelve (112) parts of calcined soda in about seven hundred (700) parts of water. Stir well for about twenty-four (24) hours, precipitate the dye with common salt, press and dry.

My new dye is characterized by the following properties:—It occurs as a brown powder, and yields an orange-yellow solution in water. The aqueous solution dyes cotton an orange-red color on boiling. Hydrochloric acid added to the aqueous solution throws down an orange-brown precipitate, while nitrite of soda and hydrochloric acid produce a brown-violet precipitate.

The dye is practically insoluble in alcohol, ether and benzene. Its solution in concentrated sulfuric acid is orange-yellow in color.

Now, what I claim is—

1. The new orange-yellow dye which can be derived from diazo-primulin and the herein described meta-phenylene-diamin-disulfoacid and which occurs as a brown powder, soluble in water giving an orange-yellow solution from which nitrite of soda and hydrochloric acid throw down a brown-violet precipitate, and which yields an orange-yellow solution in sulfuric acid.

2. The process for the manufacture of a new orange-yellow dye, consisting in first preparing a disulfoacid of meta-phenylene-diamin by treating meta-phenylene-diamin with fuming sulfuric acid in the manner hereinbefore described, and then combining this disulfoacid with diazo-primulin, all substantially as hereinbefore described.

In testimony whereof I have hereunto set my hand in the presence of two subscribing witnesses.

CARL LUDWIG MÜLLER.

Witnesses:
 ERNEST F. EHRHARDT,
 ADOLPH REUTLINGER.